(12) United States Patent
Swallow et al.

(10) Patent No.: US 8,851,357 B2
(45) Date of Patent: Oct. 7, 2014

(54) APPARATUS AND METHOD FOR REMOVING WELD FLASH

(75) Inventors: Christopher H. Swallow, St. Louis, MO (US); Ryan L. Hanks, Shipman, IL (US)

(73) Assignee: The Boeing Company, Chicago, IL (US)

(*) Notice: Subject to any disclaimer, the term of this patent is extended or adjusted under 35 U.S.C. 154(b) by 1444 days.

(21) Appl. No.: 11/672,141

(22) Filed: Feb. 7, 2007

(65) Prior Publication Data

US 2008/0185420 A1  Aug. 7, 2008

(51) Int. Cl.
  *B23K 31/10* (2006.01)
  *B23K 20/12* (2006.01)
  *B23K 37/08* (2006.01)

(52) U.S. Cl.
  CPC ............ *B23K 37/08* (2013.01); *B23K 20/1205* (2013.01)
  USPC ........................................ 228/125; 228/112.1

(58) Field of Classification Search
  CPC ...................................................... B23K 37/08
  USPC ................... 228/125; 409/297–301; 29/33 A
  See application file for complete search history.

(56) References Cited

U.S. PATENT DOCUMENTS

| | | | | |
|---|---|---|---|---|
| 2,503,476 A * | 4/1950 | Glover | | 409/301 |
| 4,239,574 A * | 12/1980 | Aust et al. | | 156/267 |
| 5,460,317 A | 10/1995 | Thomas et al. | | |
| 6,070,311 A * | 6/2000 | Lotz | | 29/33 A |
| 6,299,048 B1 * | 10/2001 | Larsson | | 228/2.1 |
| 6,375,397 B1 * | 4/2002 | Lotz | | 409/139 |
| 6,645,132 B2 * | 11/2003 | Yoshinaga | | 483/55 |
| 6,779,708 B2 | 8/2004 | Slattery | | |
| 6,910,616 B2 | 6/2005 | Halley et al. | | |
| 2003/0085257 A1 * | 5/2003 | James et al. | | 228/112.1 |
| 2006/0060635 A1 | 3/2006 | Slattery et al. | | |
| 2007/0295781 A1 * | 12/2007 | Hunt et al. | | 228/2.1 |

* cited by examiner

*Primary Examiner* — Kevin P Kerns
*Assistant Examiner* — Jacky Yuen
(74) *Attorney, Agent, or Firm* — Alston & Bird LLP

(57) ABSTRACT

An apparatus and method for removing weld flash from a structural assembly are provided. The apparatus generally includes a tool with a head that defines an edge and first and second opposite surfaces disposed at an angle converging toward the edge. A shaft, which extends from the first surface of the head, is configured to be engaged to a shaft holder of an actuation device so that the head extends from the actuation device and is configured to lift the flash from a surface of the assembly as the tool is moved in a path along a surface of the assembly with the edge contacting the flash.

7 Claims, 4 Drawing Sheets

APPARATUS AND METHOD FOR REMOVING WELD FLASH

BACKGROUND OF THE INVENTION

1) Field of the Invention

Embodiments of this invention relate to welding and, more specifically, to the removal of weld flash from a welded member, such as is typically formed during linear friction welding.

2) Description of Related Art

The term "weld flash" (or "flash") generally refers to a material deposit formed near a weld joint as a result of material that is displaced from the joint during the welding operation. Weld flash can be formed during various types of welding including various types of friction welding such as friction stir welding, rotary friction welding, and linear friction welding. Friction welding is described in U.S. Pat. No. 5,460,317 to Thomas, et al. and U.S. Pat. No. 6,779,708 to Slattery, the entirety of each of which is incorporated herein by reference. The linear friction welding process described in U.S. Pat. No. 6,779,708 includes moving a joining member against one or more structural members in a generally linear motion. Friction between the members results in heating of their contacting surfaces, thereby plasticizing the material of the joining member and/or the structural member. After sufficient plasticization has occurred, the motion is terminated and a compressive force is typically maintained between the members while the plasticized material cools and hardens to form a joint between the members. As illustrated in U.S. Pat. No. 6,779,708, flash formed during linear friction welding can be formed as a bead or ridge-like formation extending longitudinally along the edge of the linear friction weld joint where the plasticized material has been extruded from the interface between the members being welded as a result of the compressive force therebetween. The flash can be formed as a continuous bead or multiple isolated deposits.

Weld flash, which is typically considered to be an undesired result of the welding operation, can be removed. For example, pliers can be used to grip the flash and manually pull the flash from the welded members, or the flash can be chiseled from the members. In some cases, flash can be removed by a computer-guided machining device, such as a CNC machine; however, it has been found that the flash tends to clog the tool or bit of such a machine and increase the likelihood of breaking the tool. Moreover, such operations add to the time and, hence, the cost of manufacturing. In some cases, the members being welded may need to be removed from the welding machine so that flash can be removed before completion of the welding, thereby further complicating the manufacturing process and increasing the time required for manufacture.

Thus, there exists a need for an improved apparatus and method for removing flash from structural members. The method should be compatible with friction welding operations and, in particular, linear friction welding operations. Further, the method should enable the flash to be removed without excessive machining and breaking of machining tools.

SUMMARY OF THE INVENTION

Embodiments of the present invention provide an apparatus and method for removing weld flash from a structural assembly, e.g., to minimize or eliminate subsequent machining for removal of the flash. The method is compatible with various welding operations and, in particular, can be used for removing the bead or ridge-like flash formations that typically result from linear friction welding.

According to one embodiment, the apparatus includes a tool having a head that defines an edge and first and second opposite surfaces that are disposed at an angle converging toward the edge, such as an angle of about 15 degrees. The tool also defines a shaft that extends from the first surface of the head, and the shaft is configured to be engaged to a shaft holder of an actuation device so that the head extends from the actuation device and is configured to lift the flash from a surface of the assembly as the tool is moved in a path along a surface of the assembly with the edge contacting the flash. The tool can be formed as a single, monolithic steel structure.

According to one embodiment, each of the first and second surfaces is planar. The tool can define a lug that extends outward from the first surface of the head and defines a sloped interface with the first surface directed toward the edge. The shaft can extend from the lug opposite the first surface and, in some cases, the shaft extends in a direction substantially perpendicular to the second surface of the head of the tool.

The apparatus can also include an actuation device such as a linear friction welding device configured to reciprocatingly move a first structural member and urge the first structural member against a second structural member to thereby linear friction weld the two members. The actuation device can define a frame member that is configured to selectively engage the first structural member to linear friction weld the first member and engage the shaft of the tool to move the tool along the assembly. In this way, the same activation device that is used for the welding operation can be used to remove flash formed during the welding operation and, in some cases, without removing the assembly from the linear friction welding device, such that the welding and flash removal are completed in a combined process.

According to another embodiment, the method of removing flash includes providing a tool that defines a shaft extending from a wedge-shaped head defining an edge. The shaft is connected to an actuation device, and the tool is actuated with the actuation device to move in a path along a surface of the assembly to dispose the edge of the head of the tool between the surface of the assembly and a portion of the flash such that the head lifts the flash from the surface and removes the flash from the assembly. For example, the head can be moved in a direction substantially perpendicular to a longitudinal direction of the shaft. The head can be moved with a surface of the head directed toward the assembly being substantially parallel to the surface of the assembly.

According to one aspect, the method includes connecting the shaft of the tool to a frame member of a linear friction welding device and operating the linear friction welding device to move the tool by the frame member. One or more members of the assembly can be linear friction welded with the linear friction welding device, and the removal of the flash can be performed subsequent to the linear friction welding and without removing the assembly from the linear friction welding device. In some cases, a plurality of structural members can be linear friction welded to the base member so that the structural members define a slot therebetween. Further, the flash can be removed from at least a portion of the slot, and then a structural member can be welded in the slot. In this way, flash can be removed from the same space in which a member is to be welded.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
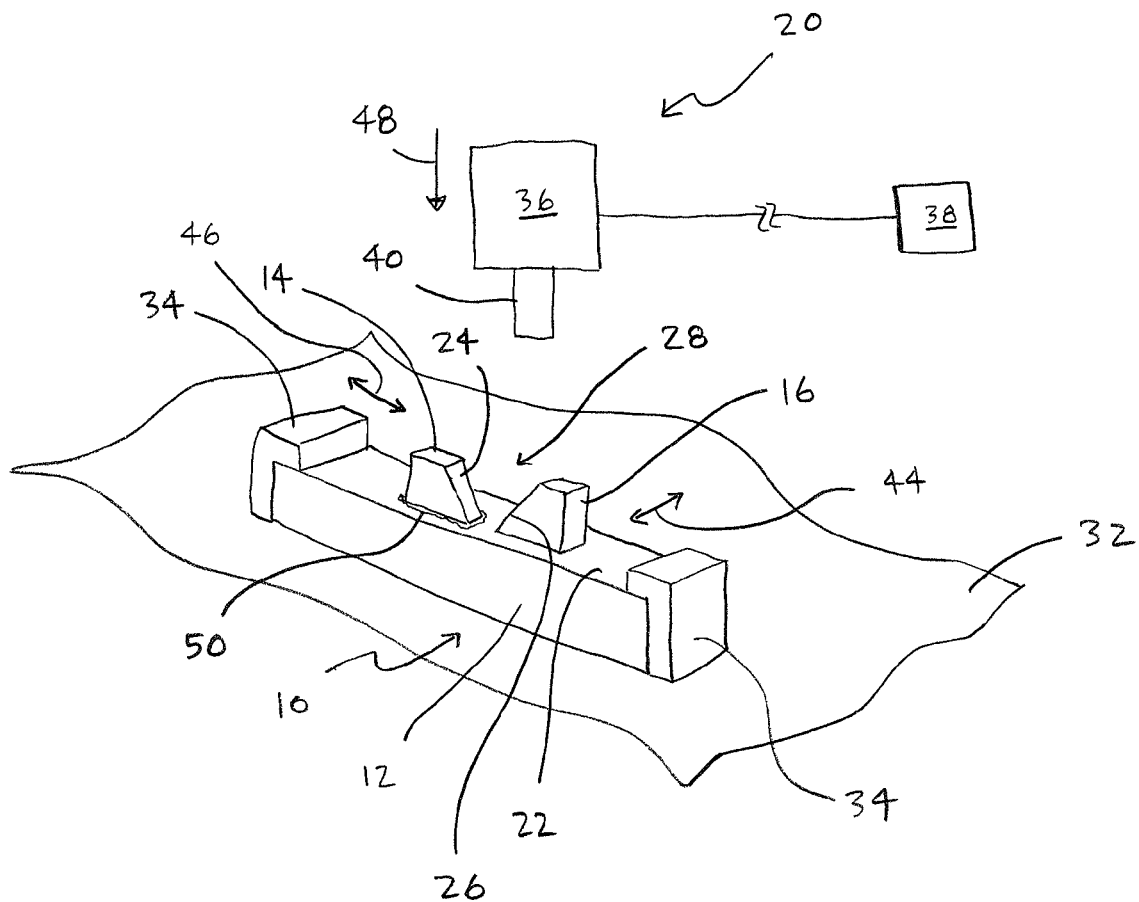
FIG. 1 is a perspective view illustrating a first structural member welded to a base member by a linear friction welding operation and a second structural member arranged for welding to the base member prior to removal of the weld flash according to one embodiment of the present invention.

Referring to the drawings and, in particular, to FIG. 1, there is illustrated a structural assembly 10 during manufacture according to a welding operation and, in particular, a linear friction welding operation. The structural assembly 10 includes a base member 12 to which multiple structural members are joined. As illustrated in FIG. 1, a first structural member 14 is linear friction welded to the base member 12. A second structural member 16 is positioned on the base member 12 but, for purposes of illustration, is shown in FIG. 1 before being linear friction welded to the base member 12 using a linear friction welding device 20, which can be a conventional linear friction welding machine.

Figure 6:
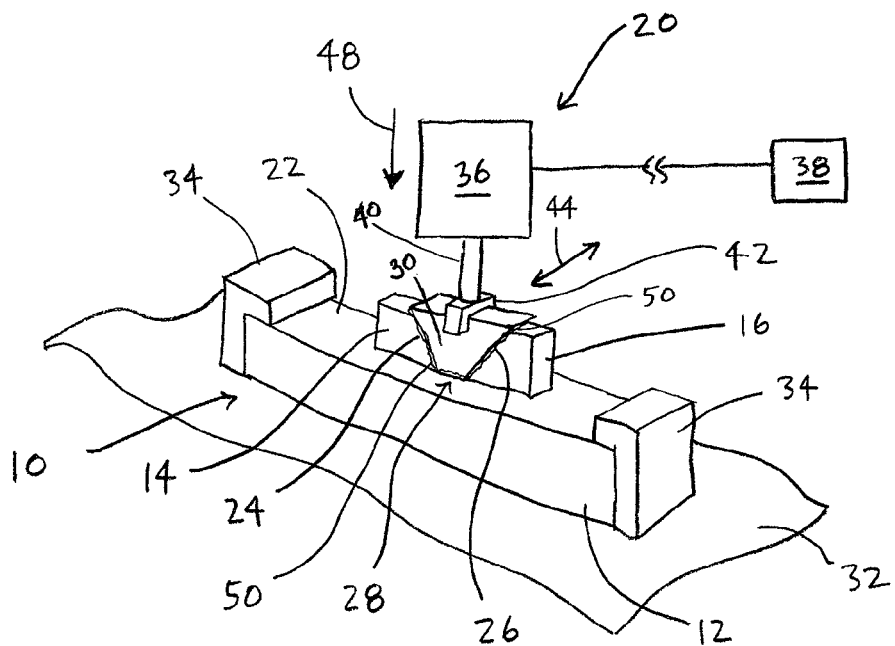
FIG. 6 is a perspective view illustrating the joining of a third structural member to the assembly of FIG. 2 by linear friction welding.

In the embodiment illustrated in FIG. 1, the base member 12 is a plate-like member that defines a substantially planar surface 22 on which the first and second structural members 14, 16 are disposed. The first and second structural members 14, 16 extend in a longitudinal direction, and the two members 14, 16 are disposed in a longitudinally spaced relationship to define a space or slot therebetween. More particularly, each structural member 14, 16 defines an angled surface 24, 26 that is directed toward the other structural member 14, 16 such that the structural members 14, 16 define an angled slot 28 therebetween. That is, the width of the slot 28 between the members 14, 16 (as measured in the longitudinal direction of the members 14, 16) is generally smallest nearest the base member 12 and is increasingly greater at positions further from the base member 12. The structural members 14, 16 are typically not in contact with one another, such that the bottom of the slot 28 is defined by the surface of the base member 12. In this configuration, the first and second structural members 14, 16 are configured to receive an additional structural member therebetween. For example, as illustrated in FIG. 6, a third structural member 30 that corresponds in shape to the angled slot 28 can be disposed in the slot 28 and linear friction welded to the base member 12 and/or the structural members 14, 16. In the embodiment shown in FIG. 6, the third structural member 30 defines a keystone shape and can define a height (measured in a direction outward from the base member 12) that is substantially the same as the height of the structural members 14, 16, or smaller or greater than the height of the structural members 14, 16. Such assemblies formed by friction welding a member in a slot defined by other members are illustrated in U.S. Pat. No. 6,779,708. Such a configuration can be useful, for example, for forming T-shaped members, i.e., with the structural members 14, 16, 30 forming the lower portion of the T-shape, and the base member 12 forming the top portion of the T-shape. In other embodiments, different configurations of the angled surfaces 24, 26 of the structural members 14, 16 can be provided, e.g., so that the third structural member 30 is disposed at a non-perpendicular angle to the base member 12, or so that the first and second members 14, 16 define a non-tapered or otherwise configured slot 28 for receiving the third structural member 30.

In some cases, one or more of the members of the assembly 10 can be formed of multiple individual component members that are disposed and/or welded separately to the assembly 10. For example, each of the structural members 14, 16, 30 can be formed of multiple component members that are arranged end-to-end or side-to-side. In this way, stock components that are shorter in length than the desired overall length of the members 14, 16, 30 can be used to form the members 14, 16, 30. Also, in some cases, the desired size of the structural members 14, 16, 30 may exceed the maximum sizes that can be easily welded. In this regard, it is noted that the surface area in contact during a linear friction welding operation, i.e., the area over which the plasticized material is to be generated, at least partially determines the forces required for performing the welding operation. An increase in the contact area generally requires greater forces. Thus, if the desired sizes of the members 12, 14, 16, 30 are large and the contact area between the mating members 12, 14, 16, 30 during each welding operation is great, the force required for performing the welding operations may exceed the maximum forces that can be generated with a particular linear friction welding machine. In some cases, it may be difficult or impractical to linear friction weld members that are as large as the desired sizes of the finished members 12, 14, 16, 30. Therefore, the members 12, 14, 16, 30 can instead be formed of multiple component members that are welded separately, e.g., by separately disposing and welding a number of component members in an end-to-end or side-to-side configuration to form each of the members 12, 14, 16, 30. Thus, large assemblies can be manufactured.

The structural assembly 10 can also be trimmed during manufacture, e.g., by machining and thereby removing portions of one or more of the members of the assembly 10 to achieve a desired shape or size. As discussed in U.S. Pat. No. 6,779,708 and in U.S. Pat. No. 6,910,616 to Halley, et al., the entirety of which is incorporated herein by reference, the desired dimensions of the structural assembly 10 can be determined first and the structural members 14, 16, 30 can then be selected to closely approximate the predetermined dimensions and configuration of the finished assembly 10, thereby reducing subsequent machining time and material waste.

The structural assemblies 10 manufactured according to the present invention can be formed in various configurations, including any number of members, and used for various applications. In particular, the assemblies 10 can be formed in configurations that include members extending at angles relative to one another, such as structural beams or panels having reinforcement flanges. A T-shaped assembly, as described above in connection with FIGS. 1 and 6, can be used as a structural beam that defines or supports portions of an aircraft or other aerospace structure, such as a wing, wing support, fuselage, and the like. The structural assemblies 10 can be formed of materials selected according to the particular application for the assembly 10, and the members of the assembly 10 can include the same or different materials. In particular, the members can be formed of titanium or titanium alloys. Alternatively, the members can be aluminum, aluminum alloys, steel, nickel-based alloys, copper-based alloys, beryllium-based alloys, mixtures thereof, or other metallic or nonmetallic materials. Structural assemblies having various configurations and formed of various materials are discussed in U.S. Pat. No. 6,779,708 and in U.S. Patent Application Publication No. 2006/0060635 to Slattery, et al., the entirety of which is incorporated herein by reference, and flash can be removed from such assemblies using embodiments of the apparatus and method of the present invention.

Figure 2:
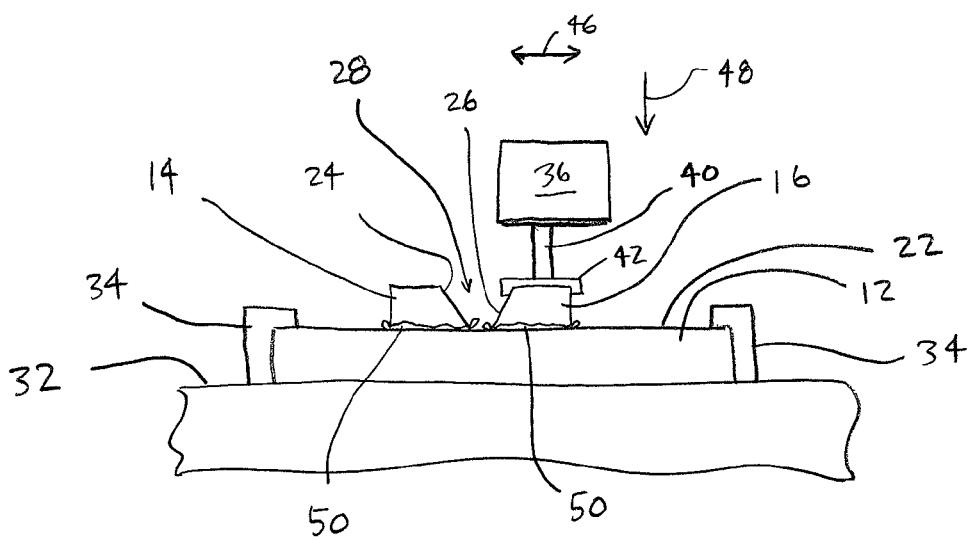
FIG. 2 is an elevation view illustrating the structural assembly of FIG. 1, shown with the second structural assembly linear friction welded to the base member.

As shown in FIGS. 1 and 2, the linear friction welding device 20 is configured to perform welding operations in a work area generally defined by a work surface 32 of the welding device 20. The work surface 32 is typically stationary and defines the work area in which the welding device 20 can operate. The base member 12 can be secured to the work surface 32, e.g., by adjustable clamps 34 that prevent the base member 12 from moving while the other members 14, 16, 30 are being welded thereto. Alternatively, the base member 12 can be secured to the work surface 32 by other clamps, bolts, tack welding, tooling, or the like.

The linear friction welding device 20 includes an actuation device 36 or mechanism for imparting movement, such as a computer numeric control (CNC) machine or similar device, as is known in the art. A controller 38 controls the motion, e.g., to provide motion having parameters that are set by an operator. For example, the actuation device 36 of the linear friction welding device 20 can include multiple electric, hydraulic, or pneumatic actuators that are configured to move a frame member 40 in any direction relative to the work surface 32 and throughout the work area defined by the work surface 32. Thus, with the frame member 40 engaged to one of the structural members 14, 16, the structural member 14, 16 can be moved relative to the other members of the assembly 10. In particular, as shown in FIG. 2, the frame member 40 is engaged to the second structural member 16 using a connection member 42. The linear friction welding device 20 moves the second structural member 16 in a generally linear reciprocating motion, e.g., in a back and forth motion that can be in the longitudinal direction 46 or transverse direction 44. For example, the actuation device 36 can oscillate the joining member 30 a distance of about ⅛ inch at a rate of about 60 hertz. Other oscillation distances and frequencies can also be used. The linear friction welding device 20 also urges the second structural member 16 against the stationary base member 12 in direction 48 to establish a compressive force between the engaged surfaces of the base member 12 and the second structural member 16. The compressive force is typically great enough to result in a pressure between the members of at least about 1000 pounds per square inch, for example, between about 20,000 and 60,000 pounds per square inch.

The motion of the second structural member 16 is continued while the compressive force is maintained, thereby resulting in friction between the two members 12, 16. The friction results in heating of the contacting surfaces of the members 12, 16, which causes the material of one or both of the members 12, 16 to plasticize and form a plasticized region between the surfaces. Once sufficient plasticization has occurred, the motion of the structural member 16 is terminated. Plasticization can be detected, for example, by mechanical or optical measurements, or friction welding can be continued for a predetermined duration based on such factors as the type of materials being joined, the size of the joint, the compressive force, and the type of joint being formed. After the motion of the structural member 16 is terminated, the compressive force can be maintained by continuing to urge the structural member 16 against the base member 12 as the members cool to thereby form a linear friction weld joint between the members 12, 16. The first structural member 14 can be linear friction welded to the base member 12 in the same way as the second structural member 16, and other structural members can be welded similarly as desired.

The direction of the reciprocal motion of the linear friction welding device 20 can be selected according to the geometry of the members and their assembly. That is, each member can be moved in a direction that does not interfere with other members already welded to the assembly 10. For example, if the second structural member 16 is to be disposed and welded as a single member, the member 16 can be moved in either the transverse direction 44 or the longitudinal direction 46. However, if the second structural member 16 is to be disposed as several component members that are successively welded to the base member 12, each successive member can be welded in a selected direction that does not interfere with the other members, e.g., by moving the component members in the transverse direction 44 if the component members are to be disposed in a longitudinally end-to-end configuration to form a long second structural member 16, or in the longitudinal direction 46 if the component members are to be disposed in a transversely side-to-side configuration to form a wide second structural member 16. It is further appreciated that the relative motion of the various members of the assembly 10 can be achieved by moving any of the members while other members are either secured in a stationary position or moved in a different pattern.

Weld flash 50 results as each of the members 12, 14, 16, 30 of the assembly 10 are welded. When the assembly 10 is manufactured by linear friction welding, the flash 50 typically results as bead or ridge-like formations that extend along each of the edges of the linear friction weld joints between the members 12, 14, 16, 30. For example, as illustrated in FIGS. 1 and 2, the flash 50 occurs proximate the interfaces defined between the members being welded, i.e., along each of the edges of the structural members 14, 16 where the plasticized material is extruded as a result of the compressive force between each structural member 14, 16 and the base member 12.

Figure 3:
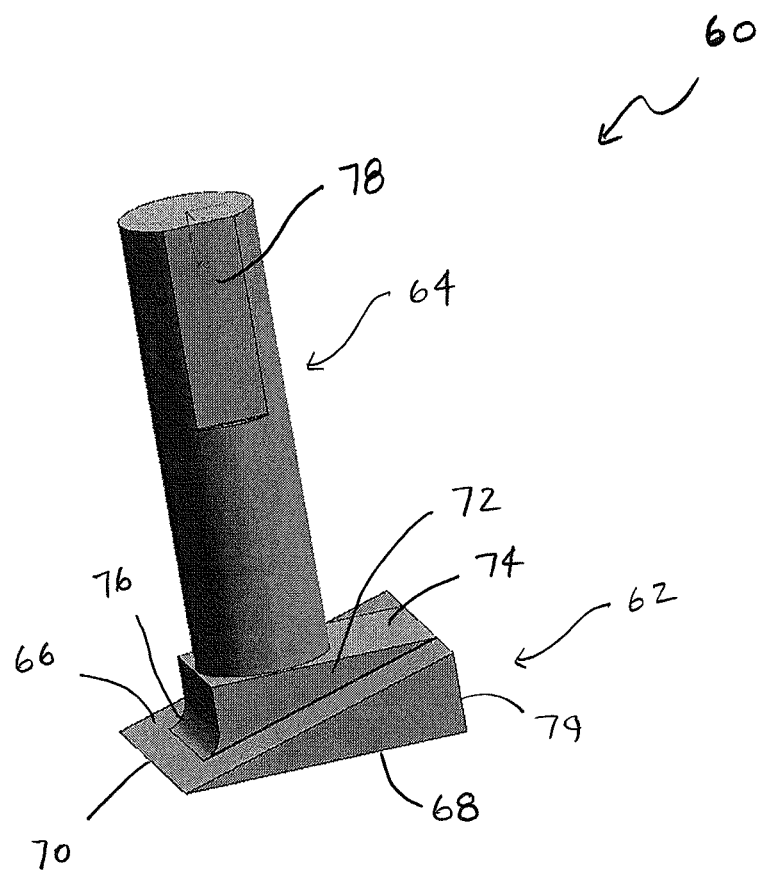
FIG. 3 is a perspective view illustrating an apparatus according to one embodiment of the present invention for removing weld flash.

FIG. 3 illustrates an apparatus or tool 60 according to one embodiment of the present invention for removing the flash 50 from the structural assembly 10. The tool 60 generally includes a head 62 that is shaped for removing the flash 50 and a shaft 64 that extends from the head 62 and facilitates the gripping and use of the tool 60. More particularly, the head 62 has a wedge-like shape defined by first and second opposite surfaces 66, 68. The surfaces 66, 68 are disposed at an acute angle that converges in a direction toward an edge 70 of the head 62. The angle between the surfaces 66, 68 can be between about 5 and 45 degrees, e.g., about 15 degrees. The head 62 further defines a lug 72 or raised formation on the first surface 66. The lug 72 has a surface 74 that is directed away from the first surface 66 of the head 62 and from which the shaft 64 extends. The surface 74 of the lug 72 can be about parallel to the second surface 68 of the head 62, and the shaft 64 can extend in a longitudinal direction that is substantially perpendicular to the second surface 68. The lug 72 does not extend to the edge 70 of the head 62 but rather terminates at a small distance from the edge 70. The termination of the lug 72 can be characterized by a sloped interface with the first surface 66 directed toward the edge 70. That is, at the interface of the lug 72 and the first surface 66, the lug 72 can define a curved or angled surface 76 relative to the first surface 66 to form a smoother transition between the lug 72 and the first surface 66 of the head 62. The shaft 64 has a cylindrical configuration in the embodiment of FIG. 3 and can define a flat 78 surface or features on the otherwise curved outer surface to facilitate the gripping of the shaft 64. In other embodiments, the shaft 64 can have other shapes and configurations.

The tool 60 can be formed of various materials, but typically is formed of a material characterized by a high strength to resist breaking when used to remove the flash 50. For example, the tool 60 can be formed of hardened steel for removing flash from assemblies formed of titanium or titanium alloys. Further, in some embodiments, the tool 60 is formed as a single monolithic structure, i.e., as a single, unitary piece of material.

Figure 4:
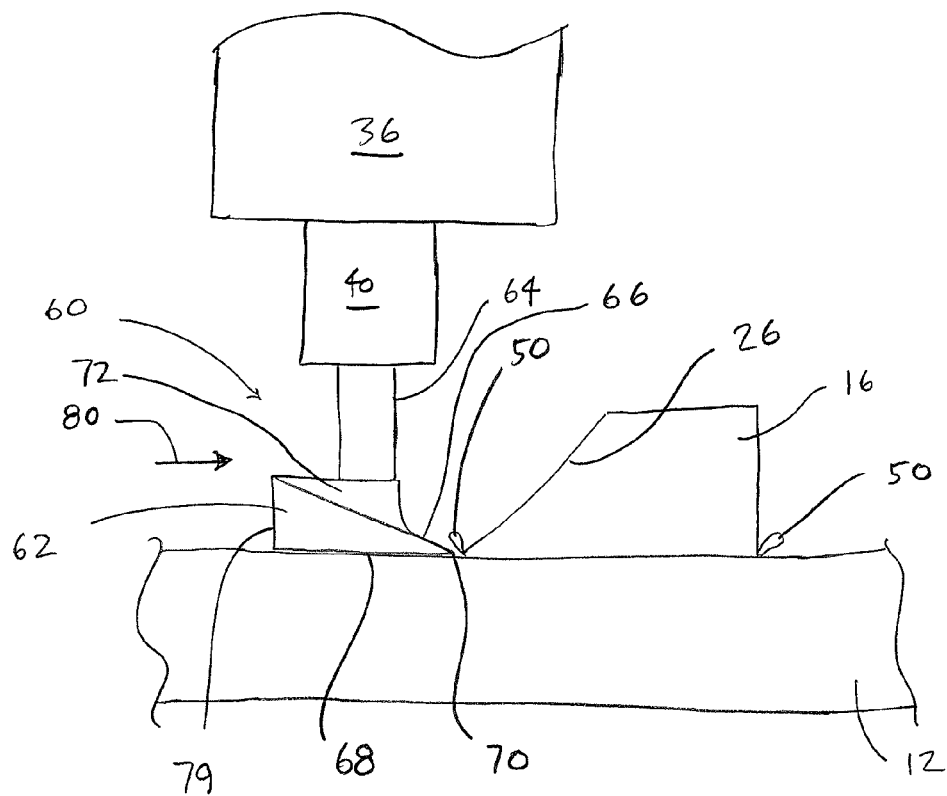
FIG. 4 is a partial elevation view illustrating the use of the apparatus of FIG. 3 for removing flash from the assembly of FIG. 2 according to one embodiment of the present invention.

The tool 60 is configured to be engaged to an actuator. In particular, the shaft 64 of the tool 60 can be received by and engaged to a shaft holder of the movable frame member 40 of the linear friction welding device 20, as shown in FIG. 4. For example, the movable frame member 40 can define a chuck or other releasable engagement mechanism for selectively engaging the shaft 64 or a connection member 42 for gripping a structural member during welding. With the tool 60 connected to the linear friction welding device 20, the tool 60 can be moved by the welding device 20 and used to remove the flash 50 from the assembly 10. In this regard, the welding device 20 can move the tool 60 in a path along a surface of the assembly 10 so that the edge 70 of the head 62 contacts the flash 50. For example, the second surface 68 of the head 62 can be maintained substantially parallel to the surface 22 of the base member 12 and in close proximity or contact with the surface 22 of the base member 12 and moved so that the edge 70 contacts the flash 50 at a point proximate the base member 12. In other words, the edge 70 is disposed between the base member 12 and at least a portion of the flash 50 so that, as the head 62 is moved along the base member 12, the flash 50 is lifted by the first surface 66 of the head 62.

In FIG. 4, the linear friction welding device 20 moves the head 62 in a direction 80 that is transverse to the extension of the flash 50, i.e., in a direction perpendicular to a longitudinal direction 82 of the flash 50, to remove the flash 50 formed near the second structural member 16. As the head 62 is moved toward the second structural member 16, the edge 70 contacts the flash 50 and the flash 50 is separated from the base member 12 and the second structural member 16 to slide up onto the first surface 66 of the head 62. In some cases, the flash 50 can also be directed onto the curved or angled surface 76 and onto the lug 72. The head 62 can remove a portion of the flash 50 that is about as wide as the width of the head 62, i.e., the length of the edge 70. The head 62 can be used to successively remove portions of the flash 50 in this fashion along one or more edges of the member 16, i.e., by backing the head 62 away from the flash 50, moving the head 62 along the longitudinal direction 82 of extension of the flash 50, and then advancing the head 62 against another portion of the flash 50.

Figure 5:
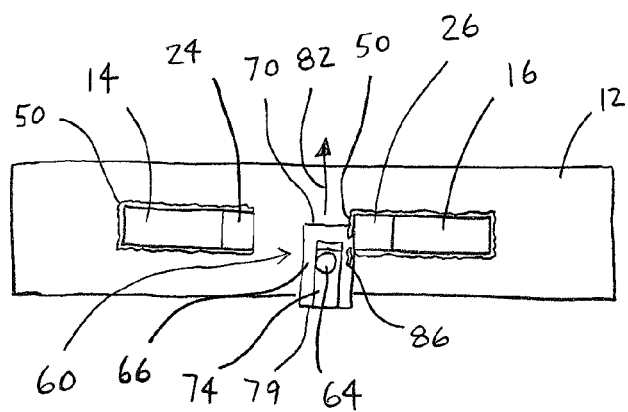
FIG. 5 is a plan view illustrating the use of the apparatus of FIG. 3 for removing flash from the assembly of FIG. 2 according to another embodiment of the present invention.

Alternatively, the linear friction welding device 20 can move the head 62 in the longitudinal direction 82 of the flash 50 to remove the flash 50, as shown in FIG. 5. In this case, as the head 62 moves parallel to the edge of the second structural member 16, the edge 70 of the head 62 contacts the flash 50 and the flash 50 is separated from the base member 12 to slide up onto the first surface 66 of the head 62. The head 62 can be moved in a single continuous motion along each side of the member 16, while continuously removing the flash 50 along the side of the member 16. The flash 50 can slide up onto the first surface 66 of the head 62 and in a direction away from the edge 70, i.e., toward the opposite side 79 of the head 62 distal to the edge 70. The flash 50 may be removed from portions 86 that are continuous or separate. The flash 50 can similarly be removed from the periphery of the first structural member 14 or other members of the assembly 10.

According to one method of the present invention, the weld flash 50 is removed from the slot 28 defined between the two structural members 14, 16 after the welding operation and without removing the assembly 10 from the linear friction welding device 20. In other words, the base member 12 can be disposed on the work surface 32 of the device 20 and retained in place on the work surface 32 during welding of the first and second structural members 14, 16 and during the removal of the flash 50. The assembly 10 need not be removed from the work surface 32 if the linear friction welding device 20 that formed the weld joints is also used to remove the flash 50. For example, after the welding device 20 is used to weld the second structural member 16 to the base member 12, the welding device 20 can be released from the second structural member 16, i.e., by releasing the engagement of the frame member 40 from the second structural member 16, and the frame member 40 can then be engaged to the tool 60 and used to move the tool 60 to perform the flash 50 removal operation. Relative to conventional operations of manually removing flash 50, in which the assembly 10 is typically removed from the welding device to facilitate manual access to the flash 50, this method of the present invention can reduce the time required for flash 50 removal and for manufacture of the assembly 10.

In some cases, some of the flash 50 may be removed before one or more structural members is welded to the assembly 10. For example, as shown in FIG. 2, any flash 50 in the slot 28 defined between the first and second structural members 14, 16 may interfere with the friction welding of the third structural member 30 into the slot 28. Therefore, the flash 50 can be removed from the slot 28 prior to the welding of the third structural member 30. The flash 50 in the slot 28 can be removed using the same linear friction welding device 20 that performs the welding operations, and the flash 50 in the slot 28 can be removed without removing the partially formed assembly 10 from the work surface 32. Flash 50 that is formed outside of the slot 28 may also be removed at the same time, i.e., before the third structural member 30 is welded, or the flash 50 outside of the slot 28 can be removed subsequent to the welding of the third structural member 30. In fact, as shown in FIG. 6, additional flash 50 may be formed when the third structural member 30 is linear friction welded to the assembly 10, and this newly formed flash 50 can be removed along with any other flash 50 that was previously formed outside of the slot 28 and not removed prior to the welding of the third structural member 30. In some cases, the tool 60 can be moved by an actuation device other than a linear friction welding device, such as a CNC machine that operates within or outside of the work area of the linear friction welding device 20.

As shown in FIG. 6, the third structural member 30 can then be engaged to the linear friction welding device 20 and urged by the device in a direction toward the base member 12 and reciprocated in a direction 44 that is perpendicular to the longitudinal direction of the third structural member 30. As the third structural member 30 is urged into the slot 28, the third structural member 30 frictionally engages and heats the angled surfaces 24, 26 of the first and second structural members 14, 16 and/or the base member 12 so that at least some of the members are plasticized. As described above, when sufficient plasticization has occurred, the motion of the third structural member 30 can be terminated, and the third structural member 30 can be urged toward the slot 28 while the plasticized material cools and hardens to form a linear friction weld between the third structural member 30 and the base member 12, first structural member 14, and/or second structural member 16.

After some or all of the welding operations, e.g., after all of the structural members of a structural assembly 10 have been welded together, the assembly 10 can be subjected to further processing, such as a machining operation to remove portions of one or more structural assemblies and achieve a final desired shape and configuration of the assembly 10, heat treatments to achieve desired material properties in the assembly 10, and/or other processing.

Figure 7:
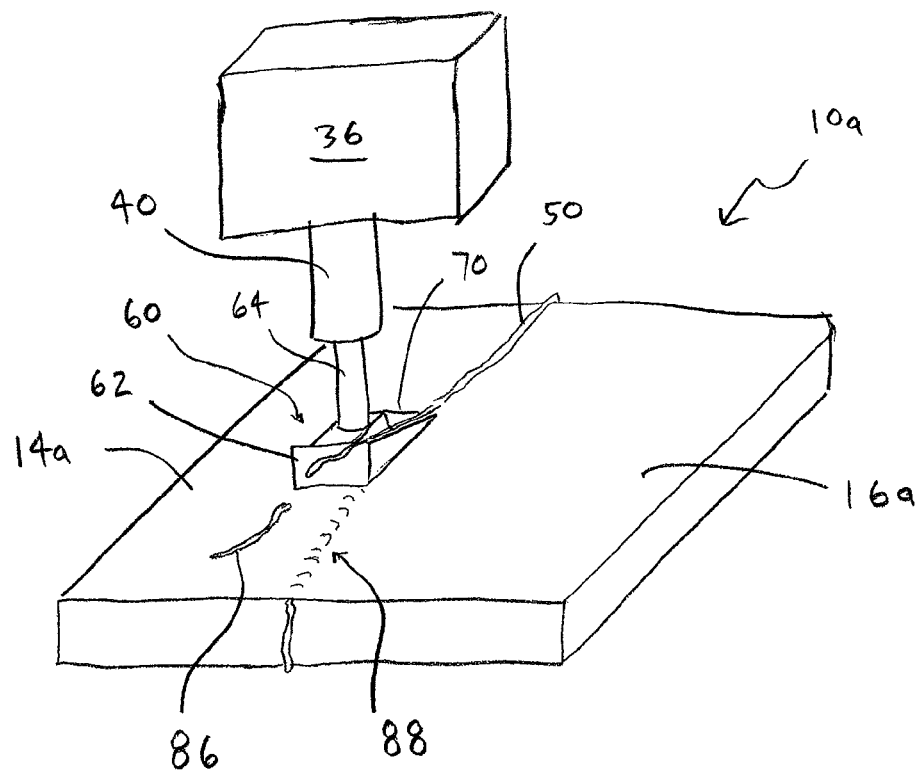
FIG. 7 is a perspective view illustrating the use of the apparatus of FIG. 3 for removing flash from a structural assembly according to another embodiment of the present invention.

The apparatus 60 of the present invention can also be used to remove flash 50 that is formed in other linear friction welding operations, such as when members are linear friction welded in other configurations to form different types of structural assemblies. In this regard, FIG. 7 illustrates an assembly 10*a* of two structural members 14*a*, 16*a* that are linear friction welded to define a butt weld joint 88 therebetween. That is, corresponding sides of the two members 14*a*, 16*a* are linear friction welded together with the members 14*a*, 16*a* in a non-overlapping configuration. In this case, flash 50, which is produced outside the interface of the two members 14*a*, 16*a*, can be removed by moving the tool 60 along the outer surface of the assembly 10 with the second surface 68 of the tool 60 in close proximity or contact with the surface of the assembly 10*a* so that the edge 70 of the tool 60 contacts the flash 50 and the flash 50 is lifted by the tool 60 away from the assembly 10*a* and removed therefrom. The assembly 10*a* defines a smooth surface at the linear friction welded joint 88 that is free, or substantially free, of flash 50.

In some cases, the various members of a structural assembly formed according to the present application can be welded using welding operations other than linear friction welding. For example, other friction welding methods can be used, such as friction stir welding, rotary friction welding, and the like. Alternatively other, non-friction welding methods can be used. However, it is appreciated that linear friction welding results in flash formations that are typically different than flash formed by other methods. Indeed, in some welding methods, minimal amounts of flash may be formed, or the flash may not be formed in a configuration that facilitates removal by the wedge-like head 62 of the tool 60 of the present invention.

Many modifications and other embodiments of the invention will come to mind to one skilled in the art to which this invention pertains having the benefit of the teachings presented in the foregoing descriptions and the associated drawings. For example, the structural members can be processed before and/or after joining by friction welding. Such processing can include cleaning the joining surfaces of the structural members to remove oxidation or surface defects. Additionally, the structural members can be heat treated by aging, quenching, stretching, annealing, or solution annealing to obtain desired mechanical or chemical properties, as is known in the art. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of removing weld flash from a structural assembly, the method comprising:
   securing a base member to a work surface;
   friction welding at least one member of the assembly to the base member with a friction welding device following securing of the base member to the work surface, wherein friction welding comprises providing a friction welding device comprising a movable frame member having a releasable engagement mechanism, engaging a connection member with the releasable engagement mechanism; and gripping the at least one member of the assembly with the connection member while movement of the frame member causes the at least one member of the assembly to correspondingly move;
   providing a tool defining a shaft extending from a wedge-shaped head defining an edge, wherein said providing step comprises providing the tool having the head defining first and second opposite surfaces disposed at an angle converging toward the edge, and a lug extending outward from the first surface with the shaft extending from the lug opposite the first surface, wherein the first and second surfaces of the head are planar, wherein the lug includes a curved surface extending outward from the first surface of the head, and wherein the curved surface of the lug intersects the first surface of the head at a distance from the edge so as to define a sloped interface with the first surface directed toward the edge;
   following the friction welding, disengaging the connection member from the releasable engagement mechanism and connecting the shaft of the tool to the releasable engagement mechanism of the movable frame member of the friction welding device;
   actuating the tool with the friction welding device to move in a path along a surface of the assembly to dispose the edge of the head of the tool between the surface of the assembly and a portion of the flash such that the head lifts the flash from the surface such that at least some of the flash passes over a portion of the planar first surface of the head and then outward from the surface along the curved surface of the lug so as to remove the flash from the assembly; and
   retaining the base member in place in a secured relationship on the work surface during removal of the flash without removal of the base member from the work surface once the base member has been secured to the work surface prior to friction welding at least until the flash has been removed from the assembly.

2. A method according to claim 1 wherein said actuating step comprises moving the head in a direction substantially perpendicular to a longitudinal direction of the shaft.

3. A method according to claim 1 wherein said actuating step comprises moving the head, wherein the second surface of the head that is directed toward the assembly is substantially parallel to the surface of the assembly.

4. A method according to claim 1, wherein friction welding at least one member of the assembly comprises linear friction welding the at least one member of the assembly with the friction welding device, and wherein said actuating step is performed without removing the assembly from the friction welding device.

5. A method according to claim 1 wherein the angle is about 15 degrees.

6. A method according to claim 1 wherein said providing step comprises providing the tool as a single monolithic structure.

7. A method according to claim 1, wherein friction welding at least one member of the assembly comprises friction welding a plurality of structural members to a base member such that the structural members define a slot therebetween prior to said actuating step and welding a structural member in the slot subsequent to said actuating step, wherein said actuating step comprises removing flash from the slot after friction welding the plurality of structural members but prior to welding the structural member in the slot, and wherein the method further comprises subsequently actuating the tool with the friction welding device after welding the structural member in the slot to remove flash from around the structural members.

* * * * *